US006738628B1

United States Patent
McCall et al.

(10) Patent No.: US 6,738,628 B1
(45) Date of Patent: May 18, 2004

(54) ELECTRONIC PHYSICAL ASSET TRACKING

(75) Inventors: Colin David McCall, Glasgow (GB); Andrew Liam Massey, Ayrshire (GB); Neil Lindsay Robertson, Ayrshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/505,116

(22) Filed: Feb. 16, 2000

(30) Foreign Application Priority Data

Sep. 3, 1999 (GB) .............................. 9920722

(51) Int. Cl.[7] .............................................. H04Q 7/20
(52) U.S. Cl. ........................ 455/456.1; 455/422.1; 455/458; 340/825.43
(58) Field of Search .................. 455/41, 456, 458, 455/466, 422, 9, 134, 229, 456.1, 422.1; 340/991, 992, 988, 989, 825.49, 572.1, 572.4, 5.8, 10.1, 505

(56) References Cited

U.S. PATENT DOCUMENTS

| 3,618,059 A | * | 11/1971 | Allen ........................... 340/539 |
| 4,021,807 A | * | 5/1977 | Culpepper et al. ........... 342/458 |
| 4,792,796 A | * | 12/1988 | Bradshaw et al. ........... 340/539 |
| 5,686,892 A | * | 11/1997 | Smith ....................... 340/568.7 |
| 5,850,609 A | | 12/1998 | Sugarbroad et al. ......... 455/456 |
| 6,055,434 A | * | 4/2000 | Seraj ............................ 455/456 |
| 6,150,921 A | * | 11/2000 | Werb et al. ................. 340/10.1 |
| 6,339,709 B1 | * | 1/2002 | Gladwin et al. ............ 455/456 |
| 6,347,229 B1 | * | 2/2002 | Zelmanovich et al. ... 455/456.1 |

FOREIGN PATENT DOCUMENTS

| EP | 0199266 | 4/1986 | ............ H04Q/7/04 |
| EP | 0874248 | 4/1998 | ............ G01S/5/14 |
| GB | 2316580 | 2/1998 | ............ H04Q/7/38 |
| WO | 9845728 | 10/1998 | ............ G01S/1/68 |

* cited by examiner

Primary Examiner—Sonny Trinh
(74) Attorney, Agent, or Firm—Gerald R. Woods

(57) ABSTRACT

Objects can be tracked within a building using a radio device associated with each object to be tracked and an array of transmitting beacons. Each of the beacons transmits identification data. The received identification data from the object to be tracked is sent to a server which determines the location of the object. The identification data may be sent from the object to the server using a data communications network such as a local area network. The beacons may have a variable power output allowing the receipt or non-receipt of the signal from the beacon to be used to assist in locating the object. The beacons may be associated with an existing wireless communication mechanism, such as Bluetooth.

2 Claims, 3 Drawing Sheets

ELECTRONIC PHYSICAL ASSET TRACKING

FIELD OF THE INVENTION

The present invention relates to systems for tracking the location of objects by means of a transceiver or a receiver associated with each of the objects together with a chain of transceiving or transmitting radio beacons and a conventional computer network.

BACKGROUND OF THE INVENTION

In any organisation where physical information technology (IT) hardware assets such as personal computers, mobiles computers, server computers and printers are used, it is important to effectively manage each asset. One area of IT asset management which is regarded as time consuming, difficult and very expensive, is recording the physical position of each IT asset. The problem is further exacerbated with the present large scale adoption of mobile computing devices, which are easily transported, but are difficult to track. Losing control of the physical location of assets leads to accounting irregularities and investment planning disruption.

The most widely adopted method is physical inventory taking. This involves identifying and recording each asset by either physically going to it, or getting users to send data to a central point. This is not a good solution because:

(i) Users don't always respond;

(ii) Data is only current for that moment in time, i.e. a user can enter data and then move the asset;

(iii) Is not very secure; and (iv) Is time consuming.

Integrated management applications generally rely on information entered by hand either at the managed system or at the management console to identify the system's location. Often this information becomes out of date because the person moving the system is not aware that the information had to be updated, or how to update it.

As systems management and troubleshooting becomes more automated, and pre-emptive maintenance is becoming more prevalent, alerts to the system manager that intervention is required at a remote system will come from the system itself, not the user, so it is imperative that location information is kept up to date. As an example, a bank branch system may report that intervention is required and as a result of the report, a technician is dispatched to the wrong town because the asset database is out of date.

Asset tracking is a well understood problem and has had several solutions applied to try and solve. One method currently being used is the inclusion of a Radio Frequency Identification (RFID) chip inside the asset. The data on this chip (typically Vital Product Data (VPD)), can be scanned using a hand held scanner, without the need to remove the asset from the packaging. This approach records the VPD of the asset, but NOT the physical position, and is also confined to around a 1 meter distance between scanner and asset.

Systems are known in which the location of individuals or objects are tracked by the use of tags attached to the individual or object. The tags receive a signal from a cell controller and reply by radio to the cell controller with the tags unique identification number. This unique identification number can be used to identify the individual or object to which the tag is attached. The location of the tag is established by calculating the distance of the tag from several different antennas, thus enabling the tag location to be precisely determined. Typical of these products is the 3D-iD Local Positioning System from PinPoint Corporation. A description of the product can be found at www.pinpoint-co.com. The cell controllers typically have a range of 250 feet (76 meters) and are dedicated for the purpose of asset tracking. The cell controllers calculate the tag location using precise time references to determine the distance of the tag from the controller.

U.S. Pat. No. 5,708,423 discloses a zone based asset tracking and control system in which each object has an associated object marker which transmits a unique id signal. As the object moves through doorways its signal is received by a sensor which transmits this information to a central data processing system.

Radio location solutions such as the Global Positioning System (GPS) can locate an asset to a very high degree of accuracy, and lightweight GPS implementations are inexpensive, but GPS does not work inside buildings. Other radio based location systems like Decca or Loran require expensive, specialised, radio frequency circuitry at both the beacon and the asset. Many radio based location systems depend on the use of directional antennae, either mechanically rotated or phased arrays.

It would be desirable to provide an asset tracking system that did not require the use of dedicated hardware such as cell controllers and also did not require hardware that was required to use a precise time reference in order to determine the location of the tag.

DISCLOSURE OF THE INVENTION

Accordingly, the present invention provides apparatus for tracking the location of one or more objects, the apparatus comprising: one or more beacons, each beacon transmitting identification data; one or more radio devices, each radio device being associated with one of the objects, each radio device being capable of receiving a signal from any one or more of said beacons; data processing apparatus, in communication with the one or more objects, for receiving identification data from the one or more objects, the identification data being derived from the transmitted identification data.

The apparatus can be used to automatically updates location information in a manner that needs no user intervention and is transparent to the overall management system.

The beacons can be part of an existing wireless communication system using, for example, the Bluetooth technology. Such technology is likely to become standard equipment for mobile and desktop computing within a few years and is inexpensive to implement.

The location mechanism uses a dense array of beacons, rather than a sparse array and so location does not depend on the direction of the beacons from the objects, only the presence of the beacon within range. because of this a simple, inexpensive omnidirectional antenna can be used.

In a preferred embodiment, communication between the data processing apparatus and the one or more objects is through a data communications network, and more preferably, a local area network.

In a preferred embodiment, only the receipt or non-receipt of a signal from the one or more beacons is used to determine the location of an object.

In an alternative embodiment, one or more of the one or more beacons transmit at two or more different powers, the transmission containing information indicating the transmit power, thereby allowing two or more different ranges from the one or more beacons to be determined.

The invention also provides a method of tracking the location of one or more objects, the method comprising the steps of: transmitting identification data from one or more beacons; receiving said identification data using one or more radio devices, each radio device being associated with one of the objects, each radio device being capable of receiving a signal from any one or more of said beacons; transmitting the received identification data from the one or more objects to data processing apparatus.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
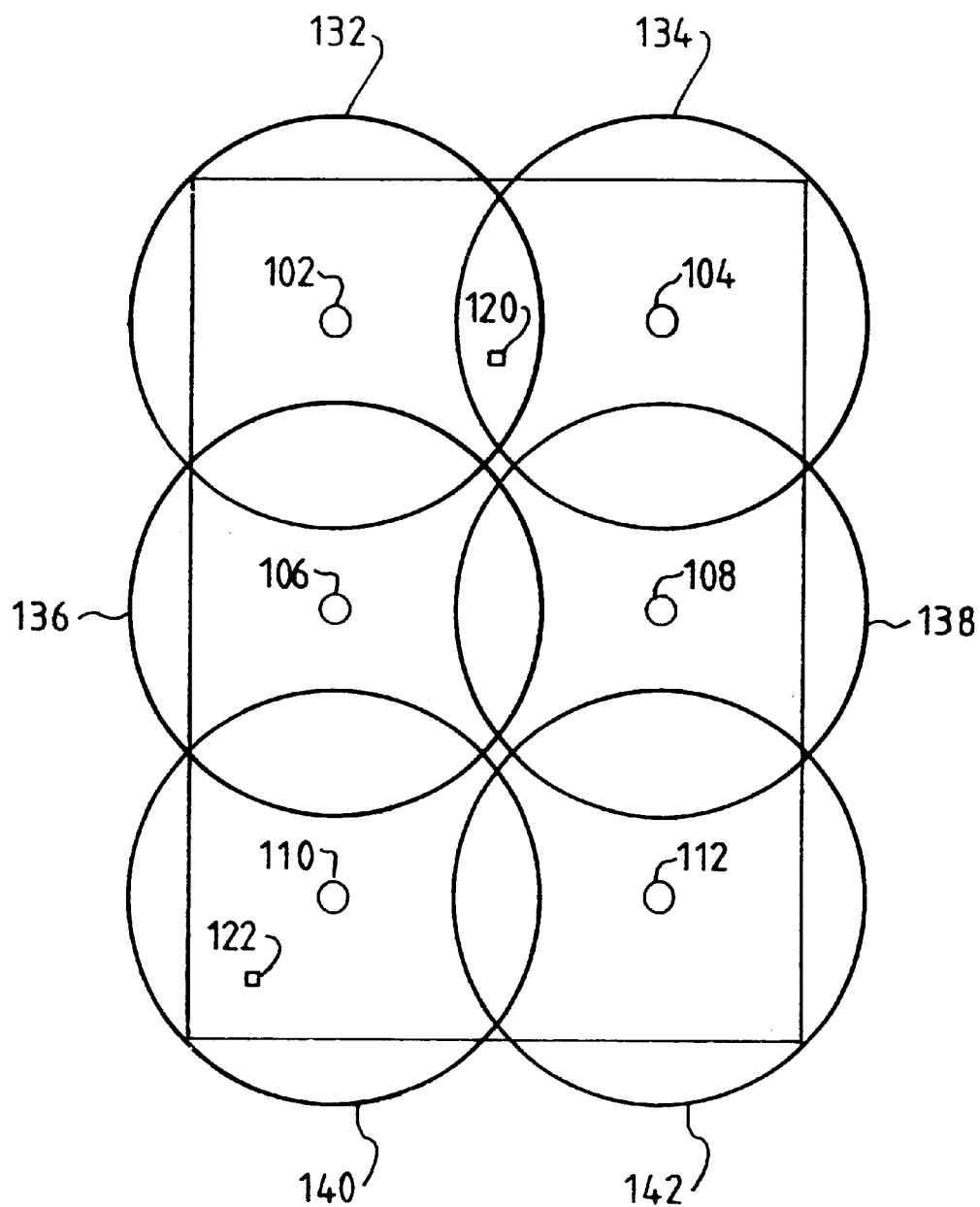
FIG. 1 shows assets and beacons located within a building.

The present invention requires that each asset to be tracked is equipped with a radio device—either a transmitter and receiver, or just a receiver. FIG. 1 shows a plurality of radio 'beacons' 102–112 distributed throughout a floor of a building 100 in which assets 120, 122 are to be tracked. Although a plurality of radio beacons 102–112 is shown in FIG. 1, the present invention may be implemented using a single beacon within a building 100. The beacons 102–112 are very simple devices which only need the capability of continuously transmitting an identifying signal where an asset contains just a receiver and of responding to a received signal in the case where an asset contains a transmitter and a receiver. The beacons may be dedicated devices, or may be attached to devices that are not expected to move, like department printers or LAN access points.

The beacons 102–112 are laid out in an approximate grid pattern. The exact layout is not critical to operation of the present invention. In particular, a grid pattern is not required. It is merely desirable that the layout of beacons is such that coverage is provided over substantially all of the area of the building in which assets are to be tracked. As an example, where the nominal range of the beacon is 10 meters, a spacing of about 14 meters provides enough resolution and coverage for most purposes. In some applications a single beacon per building or floor transmitting at a higher power level would be sufficient.

When an asset 120, 122 needs to identify its position, it transmits a signal inviting any beacons 102–112 within range to respond. The beacon responds with a signal containing a unique ID which is either burned into the radio hardware to make it globally unique or may be set by software, bit switches or similar means. In the example of FIG. 1, asset 122 transmits a signal inviting any beacons 102–112 within range to respond. Beacon 110 responds with a unique identifier that is associated only with beacon 110. The location of asset 122 may now be determined as being within a defined range of beacon 110. Since the beacons in this example have a range of 10 meters, then the location of asset 122 will now be known to within 10 meters. Also, in the example of FIG. 1, asset 120 transmits a signal inviting any beacons 102–112 within range to respond. Beacons 102 and 104 respond with their unique identifiers that are associated only with those beacons 102, 104. The location of asset 120 may now be determined as being within a defined range of both beacons 102 and 104. No attempt is made to fix the direction or distance of any beacon. Only the presence or absence of the beacon within the receiving range is required.

In an alternative embodiment, the beacon 102–112 transmits its identifying signal continuously, or at intervals. The asset 120, 122 passively listens for beacons 102–112 that are transmitting either continuously or intermittently. In this alternative embodiment the beacon need not contain a receiver and the asset need not contain a transmitter.

Figure 2:
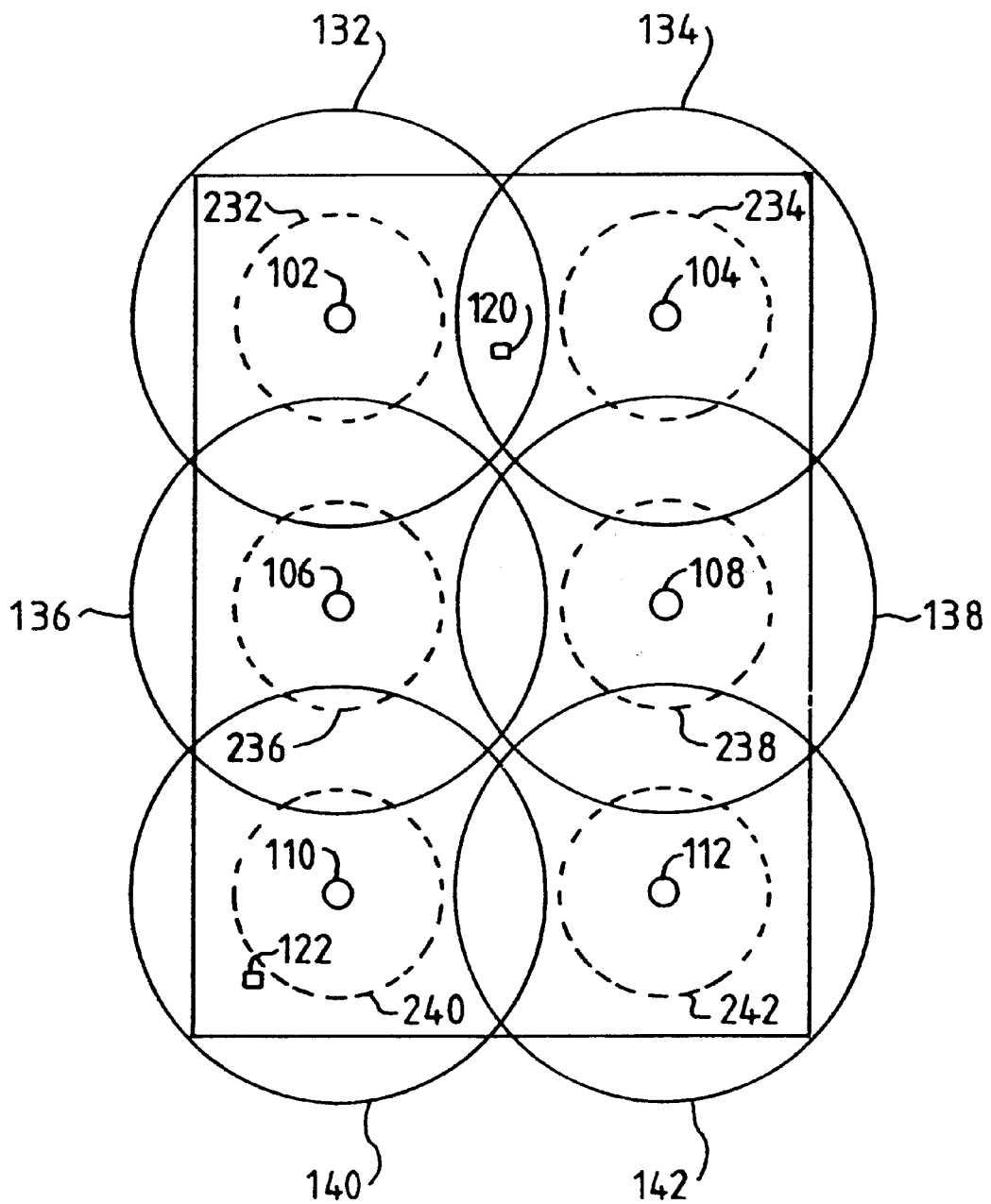
FIG. 2 shows the assets and beacons of FIG. 1 according to a variation of the invention.

FIG. 2 shows an alternative embodiment in which the beacon 102–112 sends a sequence of signals at different power output levels, and the transmitted signal contains the power level at which it is transmitted, from which a nominal range can be determined. If an asset 122 receives a '10 meter' signal from a beacon 102–112 but not a '5 meter' signal, it can be assumed to be located between 5 and 10 meters from the beacon 102–112. The 5 meter and 10 meter signals are treated as originating from different beacons in determining the location of the asset.

Figure 3:
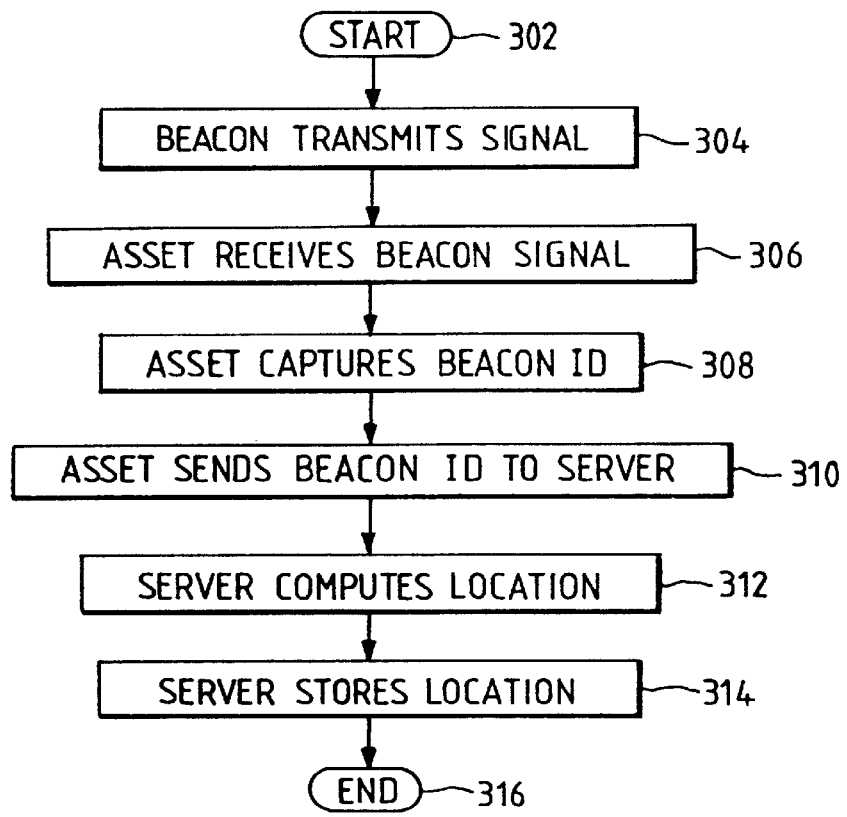
FIG. 3 is a flowchart of the process of the present invention for determining the location of an asset.

Referring to FIG. 3, which is a flowchart showing the present invention. The location process starts at step 302. At step 304, a beacon 102–112 transmits a signal. As described above, this signal may have been transmitted in response to a request from an asset 120, 122 or the beacon may transmit the signal continuously or intermittently without a request being received from the asset. At step 306, the asset 120, 122 receives the beacon signal. At step 308, the asset 120, 122 decodes the signal to determine the beacon ID. If a signal is received from more than one beacon, then each of the signals is decoded to determine the beacon ID. At step 310, the asset 120, 122 sends the beacon ID to a central server. This transmission may be over any communications network, for example a LAN or a telephone network, or a wireless network comprising a relay system through the beacons themselves. At step 312, the server computes the physical location from the beacon ID, or the server detects a change of location of the asset determined from a list of beacons and a list of asset locations held by the server. At step 314, the server stores the location of the asset in an asset location database. At step 316, the location process ends.

Figure 4:
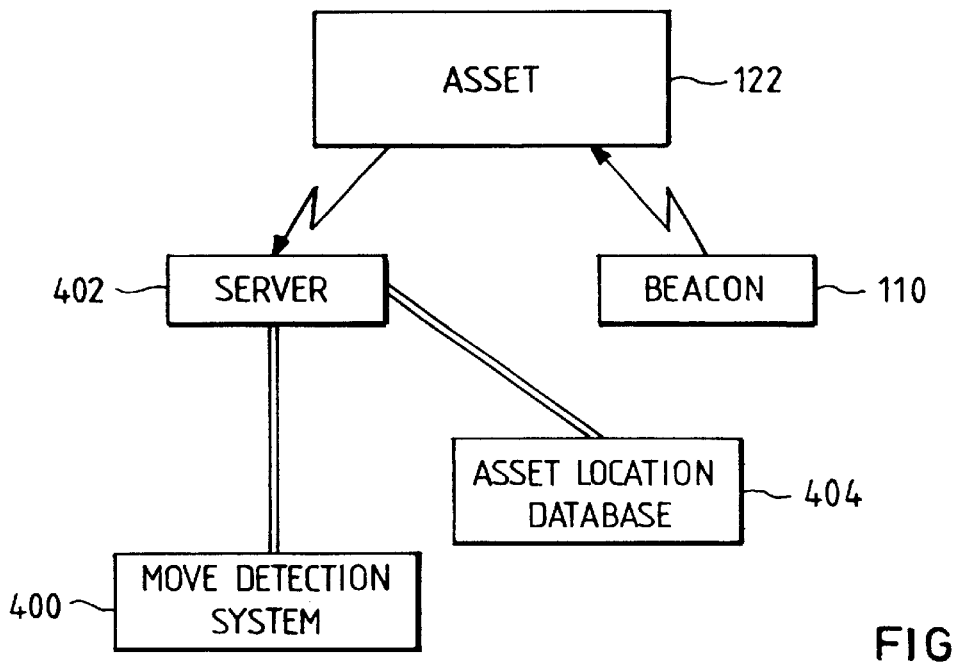
FIG. 4 is a block diagram of component parts of a system according to the present invention.

Referring to FIG. 4, which shows, in block diagram form, the component parts of a system according to the present invention. When the server 402 has determined the asset 120, 122 location, it records the location in the asset location database 404. The data recorded may be just the beacon ID or IDs or it may be the physical position determined as described below. It may optionally report the position of the asset 120, 122 to a move detection system 400 or may return the location information to the asset 120, 122 where it can be made available to management systems. The Common Information Model of the Desktop Management Task Force defines standardised ways of making asset location data or alerts available to management systems. The Common Information Model (CIM) is a schema for describing management information that is used to tie together existing differing management applications. Using this standard, the location information and move alerts could be integrated into any enterprise management system without special programming.

The asset 120, 122 may also locally compute its position, or detect a change of position, without reference to an external system, and report the results to the server 402 in the same way.

Radio signal propagation is expected to vary depending on atmospheric conditions. Since the present invention is intended to be used inside occupied buildings it is unlikely that there will be sufficient variation in conditions to disrupt the system.

The preferred implementation uses Bluetooth digital radio technology. (see http://www.bluetooth.com/ for details of the technology).

Bluetooth is an open specification for wireless communication of data and voice. It is expected to be incorporated into mobile phones, mobile and desktop computers and domestic appliances so as to allow them to communicate with each other. It consists of a single chip transceiver operating in the unlicensed 2.4 GHz band with a nominal, but programmable, range of 10 centimeters to 100 meters. This waveband will pass readily through glass or plasterboard internal partitions, but not concrete or steel walls and floors, making it ideal for short range communications in a modern office or factory building. This standard specifies an 'inquire' protocol whereby a device transmits a specified sequence of data packets, and any 'listening' device responds with its identifier, which is a globally unique number burned into the device firmware. As this technology is expected to become pervasive for communications between mobile computers and static devices, existing devices like printers or LAN or telephone access points could be used as beacons with no modification.

The present invention takes advantage of the fact that devices such as printers or LAN or telephone access points installed in a building for other purposes can be used to provide the required beacons at no, or little, additional cost.

Detecting Moves

The asset 120, 122 determines its position every time it powers on, or every time it boots up if there is no way of detecting whether it has just powered on, or every time it connects to the network and optionally at regular intervals after that. If the asset 120, 122 is mobile, it should report every time it connects to a static network or at regular intervals if it uses a wireless network to report location.

When the server 402 receives a position message from the asset 120, 122, it compares the list of beacons 102–112 in the position message with the list of beacons stored in the asset location database 404 for that asset. If they are substantially different, it alerts the asset administrator that the asset 120, 122 has been moved, and if possible, where it has been moved to. The definition of 'substantially different' will vary according to the environment in which the system is deployed.

In some applications, the grid of beacons 102–112 can be completely partitioned, such as in an organization with buildings in many locations, a campus with several buildings or a building with several floors where the concrete structure of the floor is for practical purposes completely impervious to the radio signals. In this case, if the asset 120, 122 reports hearing any beacon 102–112 from a different partition, it can be considered a significant move.

In some applications, where the layout and physical arrangement of the area is very stable, ANY change in the set of beacons 102–112 may be considered significant as there is a very high probability that this indicates a move.

In a normal application, some variation in received signals can be expected due to normal minor changes in area layout. For example, moving a metal filing cabinet may cause a receiver in an asset 120, 122 to lose a single beacon 102–112, or lose the lowest power signal from a beacon but pick up the next highest, or pick up an extra beacon, in a setup where each asset is expected to be within range of several beacons at any time. This would not be considered a significant change.

In some applications, movement of an asset within a limited area may be acceptable. In these applications, the server computes from the clients 'normal' beacon set, a 'guardband set' consisting of a ring of beacons immediately outside the normal set. If the system picks up one of these beacons, it can be considered an insignificant change, but if it picks up anything outside the guardband it is considered significant.

If an asset does not report its position for an extended period, it may have been removed from the site/network or may simply be powered off. In this case the system could use Wake-on-LAN to power the machine up and have it report its position. If the machine wakes and reports that it can not detect any beacons, it has either been moved outside the range of the beacons, or has been moved into a local hole in the coverage. In either case some action is required. Failure to wake the system would indicate that the machine is disconnected from the network or power, and possibly removed from the site. This condition should cause an alert.

Mapping the Area

Mapping the area is not always necessary, but is required for absolute location of assets (see below) or for the 'guardband' technique (above). To map the area initially, the user constructs a geographical map of the area in the server software, consisting of a set of grid points. Most modern buildings probably have a suitable map in computerized form already in the facilities management systems. It is not necessary for the beacon locations to be recorded on the map, but if they are then a good first approximation can be made for the set of beacons that should be received from any point on the map.

The setup technician then moves systematically through the area with a mobile system with a receiver, listening to the beacon system. For a 15 meter beacon grid layout, mapping on a 5 meter grid would probably be acceptable. For an office with a regular pattern of 'pens' or 'cubes', the mapping grid could usefully be based on the area layout. At each point on the grid, the system sends a message back to the server with its position, entered by the technician, and a list of the beacons it can receive. The server builds a map of the area with a list of beacons associated with each grid point.

Every time a new asset is installed, its location and list of beacons may be added to the map to check and gradually improve resolution.

Absolute Location of Assets

When an absolute location of an asset is required, the asset sends a message with its list of beacons to the server. The server then searches its map for the closest matches, and reports the probable location to be at the matching grid point, or in the vicinity of one of a set of grid points if there are several close matches. The resolution depends on the layout of beacons and the accuracy of the map, but in the normal case should locate the asset to within a 10-meter radius, or better. The form of the location information produced may be customised to the organization. Some companies may use latitude and longitude or OS grid references. Some may use building and office numbers. In the case of an organization with many small branch offices, a postal address may be the most useful.

We claim:

1. Apparatus for tracking the location of one or more objects, the apparatus comprising:
   one or more beacons, each beacon transmitting identification data, each of said beacons transmitting to one of two or more different powers, the transmission containing information indicating the transmit power, thereby allowing two or more different ranges from the one or more beacons to be determined;

one or more radio devices, each radio device being associated with one of the objects, each radio device being capable of receiving a signal from any one or more of said beacons;

data processing apparatus, in communication with the one or more objects by means of a data communications network separate from said beacons and said radio devices, for receiving identification data from the one or more objects, the identification data being derived from the transmitted identification data.

2. A method of tracking the location of one or more objects, the method comprising the steps of:

transmitting identification data from one or more beacons, each of said beacons transmitting at one of two or more different powers, the transmission containing information indicating the transmit power, thereby allowing two or more different ranges from the one or more beacons to be determined;

receiving said identification data using one or more radio devices, each radio device being associated with one of the objects, each radio device being capable of receiving a signal from any one or more of said beacons;

transmitting the received identification data from the one or more objects to data processing apparatus by means of a data communications network separate from said one or more beacons and said radio devices.

\* \* \* \* \*